(12) United States Patent
Ahmed et al.

(10) Patent No.: US 8,820,175 B1
(45) Date of Patent: Sep. 2, 2014

(54) SENSOR FOR TWO-PHASE FLOW MEASUREMENTS

(71) Applicants: King Fahd University of Petroleum and Minerals, Dhahran (SA); King Abdulaziz City for Science and Technology, Riyadh (SA)

(72) Inventors: Wael H. Ahmed, Dhahran (SA); Meamer El Nakla, Dhahran (SA); Abdel Salam Al Sarkhi, Dhahran (SA); Hassan Mohamed Badr, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 14/023,451

(22) Filed: Sep. 10, 2013

(51) Int. Cl.
*G01F 1/74* (2006.01)
*G01F 1/69* (2006.01)

(52) U.S. Cl.
CPC ... *G01F 1/69* (2013.01); *G01F 1/74* (2013.01)
USPC .................................................. 73/861.04

(58) Field of Classification Search
USPC ................ 73/861.04, 861.02, 861.27, 861.28
See application file for complete search history.

(56) References Cited

U.S. PATENT DOCUMENTS

| | | | |
|---|---|---|---|
| 3,940,985 A * | 3/1976 | Wyler | 73/861.31 |
| 4,168,624 A | 9/1979 | Pichon | |
| 4,282,481 A | 8/1981 | Dunn | |
| 5,001,936 A * | 3/1991 | Baumoel | 73/861.18 |
| 5,228,347 A * | 7/1993 | Lowell et al. | 73/861.28 |
| 5,770,805 A | 6/1998 | Castel | |
| 5,929,342 A * | 7/1999 | Thompson | 73/861.04 |
| 6,330,832 B1 * | 12/2001 | Normen et al. | 73/861.357 |
| 6,557,417 B1 | 5/2003 | Liu | |
| 6,915,703 B2 * | 7/2005 | Haase et al. | 73/861.02 |
| 6,988,400 B2 | 1/2006 | Lötters | |
| 7,062,976 B2 | 6/2006 | Gysling et al. | |
| 7,330,797 B2 * | 2/2008 | Bailey et al. | 702/50 |
| 8,061,186 B2 | 11/2011 | Gysling | |
| 8,117,921 B2 | 2/2012 | Tombs et al. | |
| 8,225,677 B2 | 7/2012 | Wang et al. | |
| 8,229,686 B2 * | 7/2012 | Rawat | 702/48 |
| 2012/0118077 A1 | 5/2012 | Henry | |

FOREIGN PATENT DOCUMENTS

CN 102095749 A 6/2011

* cited by examiner

*Primary Examiner* — Jewel V Thompson
(74) *Attorney, Agent, or Firm* — Richard C Litman

(57) ABSTRACT

The sensor for two-phase flow measurements is installed between two sections of pipe, providing an accurate measurement of radial temperature gradient in a two-phase flow. The sensor includes a heated tube having axially opposed first and second open ends. An annular sensor mount is secured about the first end thereof. First and second annular flanges are mounted to the heated tube for fluid-tight connection with the pair of pipe sections such that a two-phase fluid flowing through the pair of pipe sections continuously flows through the heated tube and a circular opening defined by the annular sensor mount. A central temperature sensor is suspended centrally within the circular opening for measuring a central temperature of the two-phase fluid. At least one peripheral temperature sensor is mounted on the annular sensor mount adjacent an inner annular wall thereof for measuring the peripheral temperature of the two-phase fluid.

12 Claims, 4 Drawing Sheets

SENSOR FOR TWO-PHASE FLOW MEASUREMENTS

BACKGROUND OF THE INVENTION

1. Field of the Invention

The present invention relates to instruments for measuring parameters of two-phase flow in pipelines and the like, and particularly to a sensor for two-phase flow measurements.

2. Description of the Related Art

Two-phase flow measurements are very important in the oil and gas, nuclear energy and chemical processing industries. Accurate measurements of the liquid and gas fractions (represented by the void fraction) and the flow pattern are essential for accurate modeling of two-phase flows. Presently, several techniques are used for two-phase flow measurements, including radiation attenuation (X-rays, γ-rays or neutron beams), optical measurement, electrical measurement (either capacitance or resistance impedance), as well as direct volume measurement using quick-closing valves utilized to separate the phases. The selected measuring technique depends on the particular application, and whether a chordal void fraction, a cross-sectional void fraction, a volumetric average void fraction, or a local void fraction is required.

The radiation attenuation method, however, is expensive and, from a safety aspect, difficult to implement. The optical technique disturbs the flow field and is relatively difficult to analyze. Although the impedance measurement technique is relatively practical and cost-effective method for making void fraction measurements, the sensitivity and error involved (due to the background electrical noise in either impedance or capacitance sensors) are major drawbacks to the technique.

Thus, a sensor for two-phase flow measurements solving the aforementioned problems is desired.

SUMMARY OF THE INVENTION

The sensor for two-phase flow measurements is installed between two sections of pipe. The sensor contains heating elements that are used to apply a heat flux to the fluid. The sensor then provides an accurate measurement of the radial temperature gradient for convective heat transfer in a two-phase flow, from which the heat transfer coefficient may be determined. The heat transfer coefficient may then be used to estimate fluid properties of the two-phase flow, such as void fraction.

The sensor includes a heated tube having axially opposed first and second open ends. An annular sensor mount is secured about the first end thereof. A circular opening is formed therethrough, which is aligned with and in open communication with the first open end of the heated tube.

First and second annular flanges are mounted on the heated tube. The first annular flange is mounted adjacent the annular sensor mount and the open first end. The second annular flange is mounted adjacent the open second end of the heated tube. The first and second annular flanges are adapted for fluid-tight connection with the pair of pipe sections such that a two-phase fluid flowing through the pair of pipe sections continuously flows through the heated tube and the circular opening of the annular sensor mount.

A central temperature sensor is mounted to the annular sensor mount and is suspended centrally within the circular opening thereof for measuring the temperature in the center of the two-phase fluid. At least one peripheral temperature sensor is embedded within the annular sensor mount adjacent the inner annular wall of the annular sensor mount so that the at least one peripheral temperature sensor is in direct thermal communication with the peripheral region of the circular opening for measuring the peripheral or wall temperature of the two-phase fluid.

The two-phase flow measurements are based on thermal field measurements. The sensor allows for measuring the void fraction in adiabatic two-phase flows by making use of the dependency of the convective heat transfer coefficient on the percentages of liquid and gas in the mixture. The system measures the temperature difference between different locations across the pipe when a constant heat flux is introduced to the sensor housing. Thus, the convective heat transfer coefficient can be determined in the fully developed section using the measured temperatures. Subsequently, the heat transfer coefficient may be correlated to the fraction of gas and liquid in the mixture.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
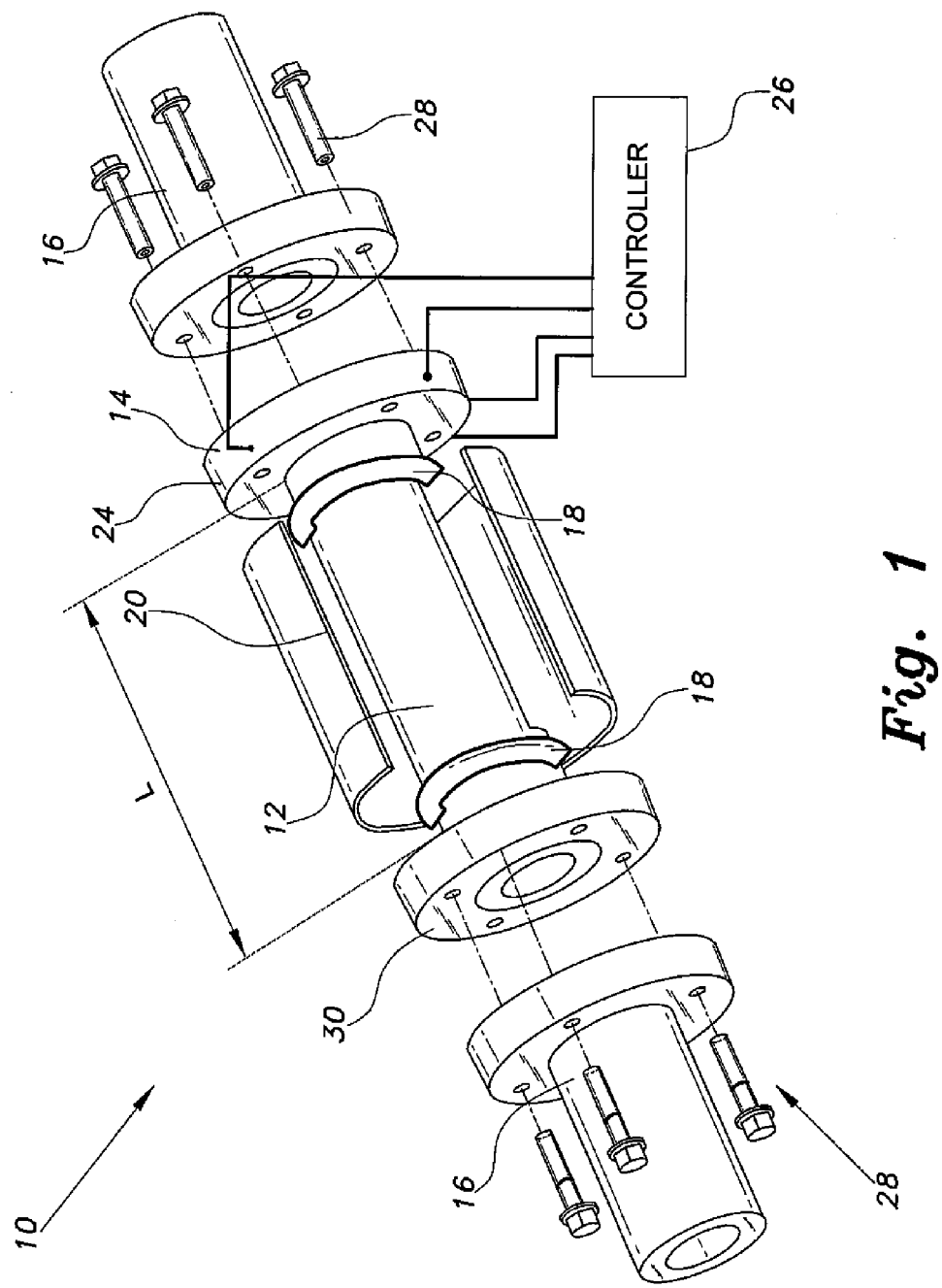
FIG. 1 is a partially exploded perspective view of a sensor for two-phase flow measurements according to the present invention.

As shown in FIG. 1, the sensor for two-phase flow measurements 10 is installed between two sections of pipe 16 and provides for accurate measurement of radial temperature gradient in a two-phase flow, which may be used to estimate fluid properties of the two-phase flow, such as void fraction. As shown, the sensor 10 includes a heated tube 12 having a length L, which extends between a pair of axially opposed annular flanges 14, 30. The inner diameter of the heated tube 12 is substantially equal to the inner diameters of annular flanges 14, 30 and the inner diameters of the pipe sections 16. Preferably, the annular flanges 14, 30 are made from a thermal insulation material to prevent heat transfer between the heated tube 12 and the pipe sections 16. It should be understood that the pipe sections 16 are shown in FIG. 1 for exemplary purposes only, and that the sensor 10 may be used with any suitable type of pipe or conduit. Similarly, it should be understood that the overall relative dimensions and configuration of the sensor 10 may be varied to mate with a particular type of pipe or conduit.

A pair of heating elements 18 are fixed or clamped to the exterior of the heated tube 12 in order to selectively heat the tube 12, as will be described in detail below. The heating elements 18 may be any suitable type of selectively and adjustably controlled heating elements and may be powered by any suitable type of external electrical power supply. In the measurement of thermal variations of the two-phase fluid, the heat flux applied to the tube 12 is relatively small. Thus, the operating temperature of both phases of the fluid are far below the saturation temperature, so that the power input for the heating elements 18 should be adjusted for a maximum increase in fluid temperature in the range of 5° C. to 10° C., based on the type of fluids in the mixture. The heated tube 12 is preferably insulated by an external, flexible insulating blanket or wrap 20 in order to minimize heat loss. The blanket 20 preferably extends axially along the heated section of tube 12, i.e., between the heating elements 18.

Figure 4:
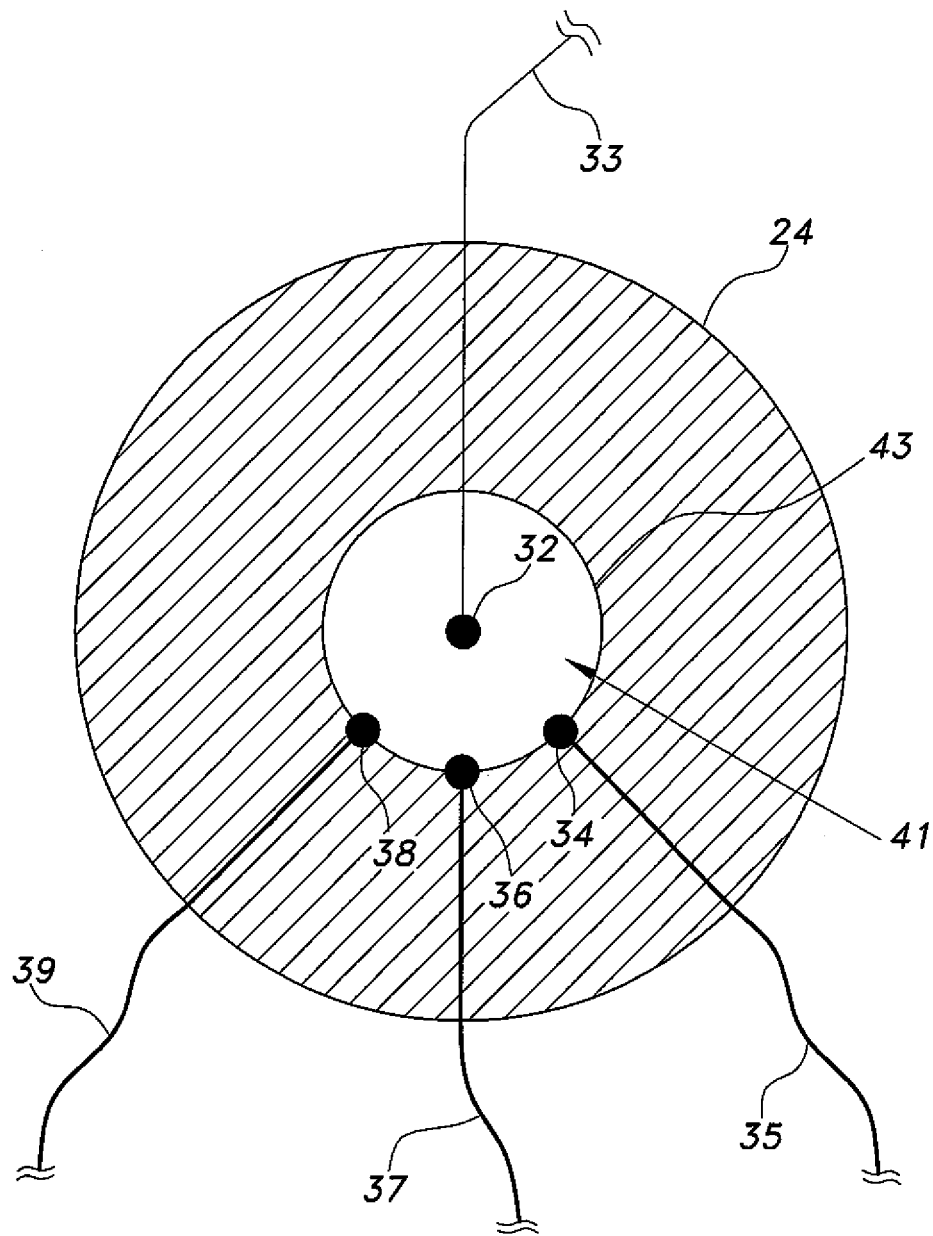
FIG. 4 is a transverse section view of the annular sensor mount of the sensor for two-phase flow measurements according to the present invention.

As shown in FIG. 1, in addition to the annular flange 14, an annular sensor mount 24 is mounted about the same end of tube 12. As shown in FIG. 4, a plurality of temperature detectors 32, 34, 36, 38 are mounted on or about the annular sensor mount 24. Any suitable type of temperature sensors may be utilized, such as resistance temperature detectors (RTDs), thermocouples, or the like. The detectors 32, 34, 36, 38 are in communication with a controller 26 for receiving temperature measurements and applying signal processing to the measured data, as will be described in detail below, via wires 33, 35, 37, 39, respectively, or the like. The controller 26, through a suitable module(s), provides the necessary power excitation to the detectors 32, 34, 26, and 38, correlates the voltage output with the resistance, and hence the temperature, providing the measured temperatures as digital data. The annular sensor mount 24 defines a central circular opening, which is aligned and communications freely with the respective open end of tube 12. The sensor 32 is suspended by wire 33 such that sensor 32 is positioned centrally within the circular opening 41 in the center of fluid flow. The peripheral sensors 34, 36, 38 are embedded within or mounted on the annular sensor mount 24 such that they are adjacent the inner annular wall 43 and in open thermal communication with the peripheral region of the circular opening 41. The sensor 10 is releasably secured to the pipe sections 16 by dielectric screws 28 or the like.

Figure 2:
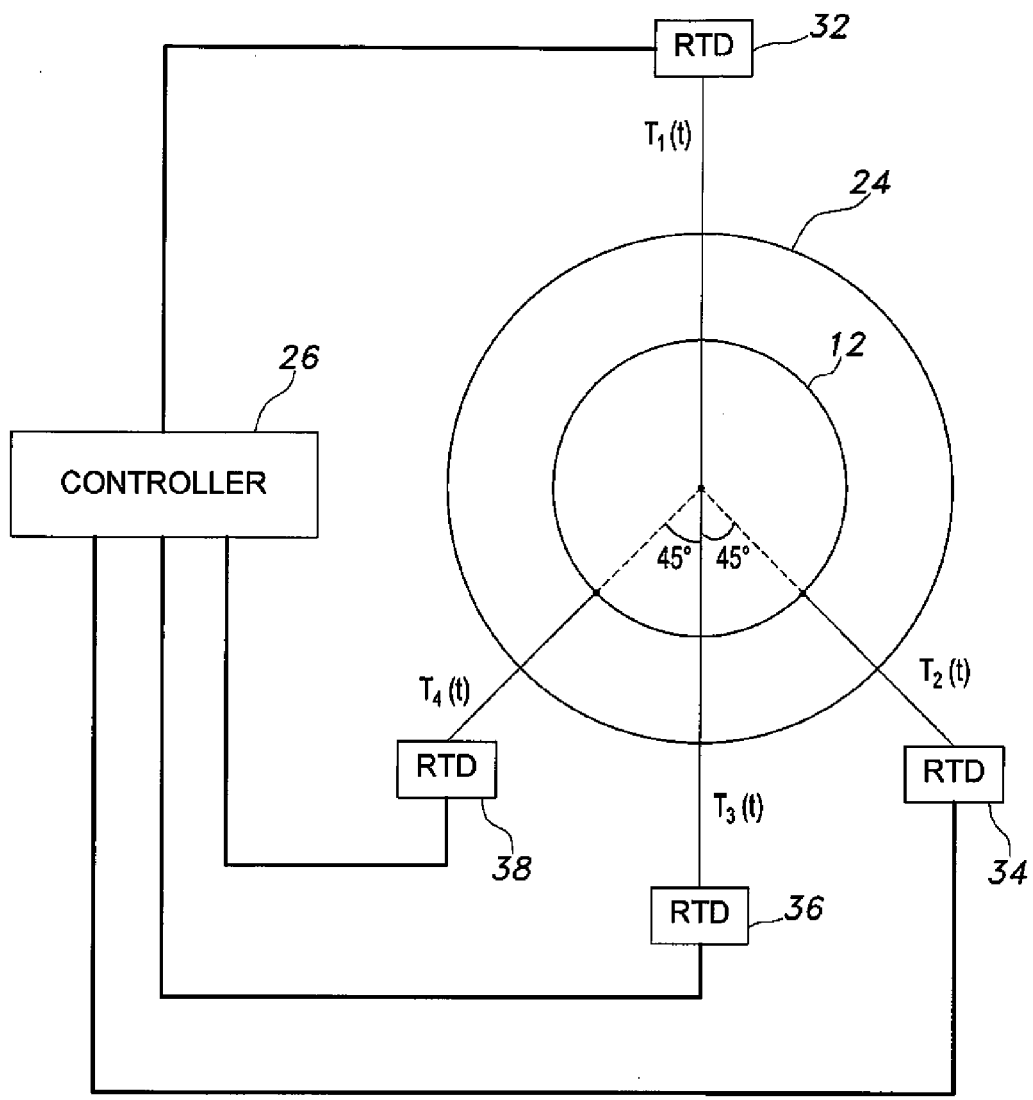
FIG. 2 a schematic diagram illustrating positioning of temperature detectors inside the tube of the sensor for two-phase flow measurements according to the present invention.

As diagrammatically illustrated in FIG. 2, the RTD detector 32 measures instantaneous temperature $T_1(t)$ at the center of the interior of the of heated tube 12 (i.e., at a radius of zero, measured from the central axis of the tube 12). The three peripheral RTD detectors 34, 36, 38 are positioned flush against the inner wall of the tube 12 to measure the instantaneous wall temperatures $T_2(t)$, $T_3(t)$ and $T_4(t)$, respectively. Each RTD detector 32, 34, 36, 38 is preferably connected to a standard electrical bridge circuit for temperature measurement. The output voltage of each detector circuit is then connected to the controller 26 for data processing and calibration.

In FIG. 2, the three peripheral detectors 34, 36, 38 are shown being arranged symmetrically, such that the detector 36 defines a radial axis with detector 32, and detectors 34, 38 are each positioned at a 45° angle away from this radial axis. However, it should be understood that the sensor arrangement may be varied by placing more sensors on the internal wall of tube 12 at different angles if asymmetrical two-phase flow is expected in the pipe 16. Preferably, the external wall temperature measurements are obtained from sensors distributed over the pipe circumference to obtain more reliable results in the calculation of an average wall temperature.

The average wall temperature $T_{w,avg}$ is considered to be the average of the three wall temperature detectors 34, 36, 38:

$$T_{w,avg} = \frac{T_2(t) + T_3(t) + T_4(t)}{3} \quad (1)$$

In order to determine the heat transfer at a distance L located in the thermally fully-developed region, the temperature difference between the internal temperature sensor 32 and the average wall temperature $T_{w,avg}$ is evaluated. The amount of heat flux q"(t), which is measured by a conventional heat flux sensor (such sensors are commercially available and well known in the art, and need not be described further), at any time t is:

$$q''(t) = h \cdot (T_1(t) - T_{w,avg}(t))(W/m^2), \quad (2)$$

where $T_1(t)$ is the temperature at the center of the tube, and the heat flux q"(t) is constant. Equation (2) may be rearranged to solve for h, which is the heat transfer coefficient. The sensor length L is determined based on the range of flow rates in the piping system. The value of L is approximately 10 pipe diameters in the preferred embodiment.

In equation (2), the temperature difference and the heat flux are measurable quantities. Thus, the instantaneous heat transfer coefficient is obtained based on the instantaneous measurement of temperatures, while the heat flux is kept constant based on the sensor rating. For air-water flows, the heat flux is found to be 1.5 kW/m². This value is adjusted and recommended for each sensor measurement range, fluid(s) used and geometrical specifications. The temperature detectors 32, 34, 36, and 38 and the heat flux sensor send an electronic signal corresponding to the measured temperatures and measured heat flux to the controller 26, which calculates the average wall temperature using equation (1) and the heat transfer coefficient h by rearrangement of equation (2). The controller 26 may be a computer programmed to carry out the calculations, a device equipped with a digital signal processor, a programmable logic controller, or other suitable device.

The heat transfer coefficient is a function of the fluid properties, as typically found in the available heat transfer correlations. In the present system, the Dittus-Boelter correlation is used:

$$\frac{hD}{k} = 0.023 \, Re^{0.8} Pr^{0.4}, \quad (3)$$

where the Reynolds number Re and Prandtl number Pr are functions defined as:

$$Re = \frac{\rho V D}{\mu} \text{ and} \quad (4)$$

$$Pr = \frac{C_p \mu}{k}, \text{ respectively,} \quad (5)$$

where V is the velocity of both phases (m/s) (V is also measured by a conventional, commercially available sensor for measuring the velocity of fluid flow in a pipe, which sends a corresponding signal to the controller), D is the pipe diameter (m) of the tube 12 (which is a known quantity), k is the thermal conductivity of the two-phase fluid (W/m·K), $C_p$ is the specific heat (kJ/Kg·K) of the two-phase fluid, μ is dynamic viscosity (Pa·s) of the two phase fluid, and ρ is the two-phase fluid density (kg/m³). These properties are correlated with the void fraction α in the following equations:

$$\mu = \alpha(\mu_{gas}) + (1-\alpha)\mu_{liquid}, \quad (6)$$

$$c_p = \alpha(c_{p_{gas}}) + (1-\alpha)c_{p_{liquid}}, \quad (7)$$

$$k = \alpha(k_{gas}) + (1-\alpha)k_{liquid}, \text{ and} \quad (8)$$

$$\rho = \alpha(\rho_{gas}) + (1-\alpha)\rho_{liquid}. \quad (9)$$

The controller 26 can then estimate the void fraction α according to the algorithm summarized in Table 1.

TABLE 1

Algorithm for Estimating Void Fraction

Step # Step

1. Substitute values for $\mu_{gas}$ and $\mu_{liquid}$ from look up tables for single phase flow into equation (6) to obtain μ as a function of the single variable α, i.e., $\mu = f1(\alpha)$.
2. Substitute values of $c_{p_{gas}}$ and $c_{p_{liquid}}$ from look up tables for single phase flow into equation (7) to obtain $c_p$ as a function of the single variable α, i.e., $c_p = f2(\alpha)$.
3. Substitute values of $k_{gas}$ and $k_{liquid}$ from look up tables for single phase flow into equation (8) to obtain k as a function of the single variable α, i.e., $k = f3(\alpha)$.
4. Substitute values of $\rho_{gas}$ and $\rho_{liquid}$ from look up tables for single phase flow into equation (8) to obtain ρ as a function of the single variable α, i.e., $\rho = f4(\alpha)$.
5. Substitute ρ from Step (4), the measured value of V, the known value of D, and μ from Step (1) into equation (4) to obtain Re as a function of the single variable α, i.e., $Re = [f4(\alpha) \times V \times D]/[f1(\alpha)] = f5(\alpha)$.
6. Substitute $c_p$ from Step (2), μ from Step (4), and k from Step (3) to obtain Pr as a function of the single variable α, i.e., $Pr = [f2(\alpha) \times f1(\alpha)]/[f3(\alpha)] = f6(\alpha)$.
7. Substitute the calculated value of h from equation (2), the known tube diameter D, k from Step(3), Re from Step (5), and Pr from Step (6) into equation (3), rearrange the equation, and solve for the void fraction α.

Steps (1) through (4) of the algorithm in Table 1 may be performed automatically by the controller 26 from electronic look up tables given identification of the gas and the liquid in the two-phase flow, or manually by look up of the single phase values in published reference books and manual entry by keyboard or keypad, depending upon the particular device used for the controller 26. Step 7 would be difficult and time-consuming to perform by hand, but the built-in mathematical functions in the libraries of C, C++, Visual C++, Visual. Basic, Java, Fortran, and other software programming languages that may be used to implement the algorithm in Table 1 permit rapid and nearly real-time estimates of the void fraction (the ratio of the gas to the total gas/liquid in the two-phase flow, either by sectional area or by volume), thereby permitting timely adjustment of valves to control the flow as needed.

The controller 26 may have a built-in monitor for display of the estimated void fraction, or the controller 26 may be programmed to save, print, or wirelessly transmit the data to a remote monitoring workstation for further processing or continuous monitoring. The values estimated by the algorithm in Table 1 are instantaneous values, but the controller may be programmed to compute time-averaged values for predetermined sampling intervals by averaging the instantaneous estimates, if desired. The sensor 10 may also be used to determine liquid holdup and phase distribution.

Equation (3) may be further refined to include a Model Correction Factor (MCF) for the sensor 10. This correction factor is based on the flow range and type of fluids used, and can be evaluated using standard static calibration techniques for two-phase flows. Thus, equation (3) may be modified as:

$$\frac{hD}{k} = MCF \times 0.023 \, Re^{0.8} Pr^{0.4}. \quad (10)$$

Figure 3:
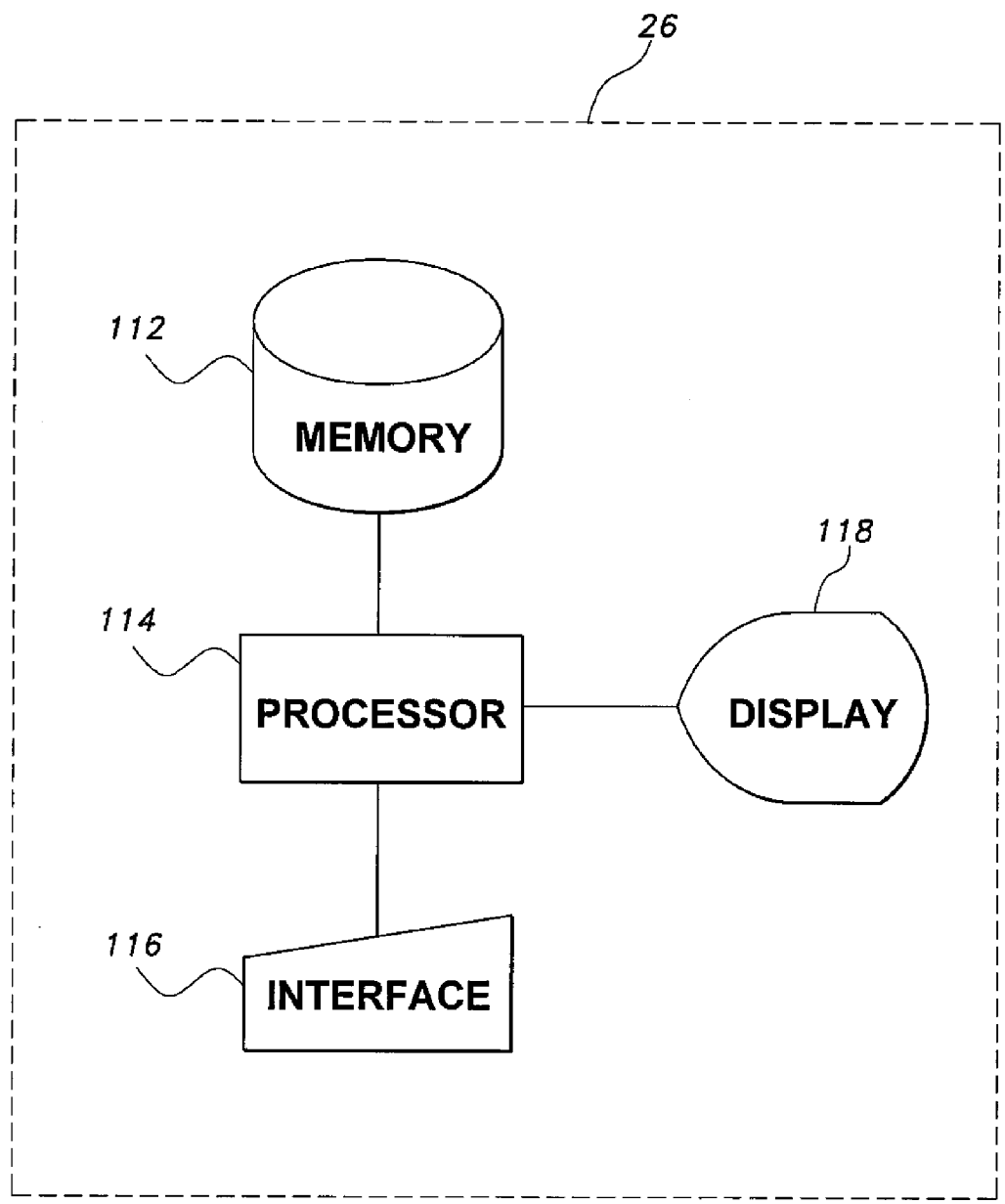
FIG. 3 is a block diagram showing exemplary components of the controller of the sensor for two-phase flow measurements according to the present invention.

It should be understood that the calculations may be performed by any suitable computer system or controller, such as that diagrammatically shown in FIG. 3. Data is received by controller 26 from detectors 32, 34, 36 and 38, and may be further input via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

The sensor 10 may be installed in any flow direction (i.e., vertical, horizontal or inclined) and can be used to identify the void fraction for different flow patterns including stratified, stratified wavy, annular, slug and bubble flows. The signal obtained from the sensor 10 can be used to determine the liquid holdup or gas void fraction in addition to liquid level. Additional signal processing can be performed between each sensor pair (the sensor 32 located at the pipe centerline and each wall temperature sensor) to determine the phase distribution around the pipe.

It is to be understood that the present invention is not limited to the embodiments described above, but encompasses any and all embodiments within the scope of the following claims.

We claim:

1. A sensor for two-phase flow measurements, comprising:
a tube having axially opposed first and second open ends;
an annular sensor mount secured about the first end of the tube, the sensor mount having a circular opening formed therethrough aligned and in open communication with the first open end of the tube;
first and second annular flanges, the first annular flange being mounted on the tube adjacent the sensor mount and the open first end of the heated tube, the second annular flange being mounted on the tube adjacent the open second end thereof, the first and second annular flanges being adapted for forming a fluid-tight connection between a pair of pipe sections such that a two-phase fluid flowing through the pair of pipe sections continuously flows through the tube and the circular opening of the annular sensor mount;

at least one heating element attached to the tube for heating fluid flow therein;

a central temperature sensor mounted to the annular sensor mount and suspended centrally within the circular opening thereof for measuring temperature in the center of the two-phase fluid flow; and at least one peripheral temperature sensor mounted on the annular sensor mount such that the at least one peripheral temperature sensor is in direct thermal communication with a peripheral region of the circular opening for measuring temperature at the periphery of the two-phase fluid flow.

2. The sensor for two-phase flow measurements as recited in claim 1, wherein the first and second annular flanges are each formed from a thermal insulation material.

3. The sensor for two-phase flow measurements as recited in claim 1, wherein said at least one heating element comprises first and second heating elements disposed at opposite ends of said tube for selectively heating the two-phase fluid flow.

4. The sensor for two-phase flow measurements as recited in claim 3, further comprising a flexible thermal insulation blanket wrapped around said tube for preventing heat loss.

5. The sensor for two-phase flow measurements as recited in claim 1, wherein the central temperature sensor comprises a resistance temperature detector.

6. The sensor for two-phase flow measurements as recited in claim 1, wherein the at least one peripheral temperature sensor comprises a resistance temperature detector.

7. The sensor for two-phase flow measurements as recited in claim 1, wherein the at least one peripheral temperature sensor comprises first, second and third peripheral temperature sensors.

8. The sensor for two-phase flow measurements as recited in claim 1, wherein the annular sensor mount defines an inner circumference, said first, second, and third peripheral temperature sensors being sequentially spaced 45° apart on the inner circumference.

9. The sensor for two-phase flow measurements according to claim 1, wherein said at least one peripheral temperature sensor comprises a plurality of peripheral temperature sensors, the sensor for two-phase flow measurements further comprising a controller connected to said central temperature sensor and to said peripheral temperature sensors, said controller having:

means for calculating an average of instantaneous temperature measurements made by the plurality of peripheral temperature sensors, the average being termed the wall temperature; and means for calculating the difference between the wall temperature and an instantaneous temperature measured by said central temperature sensor simultaneous with the instantaneous temperature measurements made by the plurality of peripheral temperature sensors, the difference being termed the temperature gradient.

10. The sensor for two-phase flow measurements according to claim 9, wherein said controller further comprises means for determining the heat transfer coefficient from the temperature gradient and a measured constant heat flux applied to the two-phase flow by said at least one heating element, the heat transfer coefficient h being defined by:

$$h = \frac{q''(t)}{(T_1(t) - T_{w,avg}(t))},$$

where q"(t) is the measured heat flux and $(T_1(t) - T_{w,avg}(t))$ is the temperature gradient.

11. The sensor for two-phase flow measurements according to claim 10, wherein said controller further comprises means for estimating the void fraction of the two-phase flow from said heat transfer coefficient h, measured velocity V of the two-phase flow, the diameter D of the two-phase flow, and from reference values for the gas phase and the liquid phase, respectively, for the thermal conductivity k, the specific heat $c_p$, the dynamic viscosity μ, and the density ρ of the corresponding single phase flow of each of the phases, the means for estimating the void fraction including solving the following set of equations simultaneously to obtain the void fraction α:

$$\frac{hD}{k} = 0.023\, Re^{0.8} Pr^{0.4};$$

$$Re = \frac{\rho V D}{\mu};$$

$$Pr = \frac{c_p \mu}{k};$$

μ=α(μ$_{gas}$)+(1−α)μ$_{liquid}$;

$c_p$=α($c_{p\,gas}$)+(1−α)$c_{p\,liquid}$;

k=α(k$_{gas}$)+(1−α)k$_{liquid}$; and

ρ=α(ρ$_{gas}$)+(1−α)ρ$_{liquid}$;

wherein Re is the Reynolds number for the two-phase flow, Pr is the Prandtl number for the two-phase flow, unsubscripted variables μ, $c_p$, k, and ρ are the corresponding values for two-phase flow, and subscripted variables μ, $c_p$, k, and ρ are the corresponding values for single-phase flow.

12. A method for estimating void fraction of a two-phase fluid flow from convective heat transfer, comprising:

applying heat to a wall of a pipe to generate a constant heat flux in a flow of a two-phase fluid through the pipe, the two phases being gas and liquid;

using a central temperature sensor to measure temperature of a two-phase fluid flow in a pipe at a center of the pipe, the central temperature sensor generating a first signal;

using a plurality of peripheral temperature sensors angularly spaced apart and substantially coplanar with the central temperature sensor to obtain a plurality of peripheral temperature measurements of the two-phase flow at the wall of the pipe, the plurality of peripheral temperature sensors generating a plurality of peripheral temperature signals;

receiving the signals at a signal processing controller;

averaging the plurality of peripheral temperature signals to obtain an average wall temperature, the averaging being performed by the controller;

determining a difference between the temperature of the two-phase flow at the center of the pipe and the average wall temperature, the determining being performed by the controller;

measuring a constant heat flux;

receiving the measured heat flux at the controller;

determining a heat transfer coefficient for the two-phase flow from the measured heat flux and the temperature difference at the center and periphery of the two-phase flow, the determining the heat transfer coefficient being performed by the controller;

obtaining thermal conductivity, specific heat, dynamic viscosity, and density of the two-phase flow, respectively, as functions of void fraction as a single variable by relation to reference table values of corresponding single-phase flow characteristics for each of the phases;

obtaining a Reynolds number Re and a Prandtl number Pr as functions of the heat transfer coefficient of the two-phase flow, measured velocity V of the two-phase flow, a diameter of the pipe, and the thermal conductivity, the specific heat, the dynamic viscosity, and the density of the two-phase flow, respectively, as functions of the void fraction as a single variable; and using the controller to solve:

$$\frac{hD}{k} = 0.023\, Re^{0.8} Pr^{0.4}$$

for the void fraction as the single variable.

* * * * *